(12) United States Patent
Segawa (10) Patent No.: US 7,798,698 B2
(45) Date of Patent: Sep. 21, 2010

(54) LIGHTING DEVICE AND DISPLAY DEVICE

(75) Inventor: Masaru Segawa, Kanagawa-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 281 days.

(21) Appl. No.: 12/076,601

(22) Filed: Mar. 20, 2008

(65) Prior Publication Data
US 2008/0232133 A1    Sep. 25, 2008

(30) Foreign Application Priority Data
Mar. 23, 2007   (JP) .............................. 2007-077932
Apr. 6, 2007    (JP) .............................. 2007-100924

(51) Int. Cl.
*F21V 7/04* (2006.01)
(52) U.S. Cl. ...................... 362/616; 362/607; 362/610; 362/601; 362/623; 349/65
(58) Field of Classification Search ................ 362/607, 362/610, 616, 623, 601; 349/64, 65
See application file for complete search history.

(56) References Cited

U.S. PATENT DOCUMENTS

| 5,396,350 | A  | * | 3/1995  | Beeson et al. .................. 349/62 |
| 6,118,503 | A  | * | 9/2000  | Oki et al. ...................... 349/65 |
| 6,305,813 | B1 | * | 10/2001 | Lekson et al. ................ 362/625 |
| 6,343,867 | B1 | * | 2/2002  | Suzuki et al. ................ 362/610 |
| 7,534,026 | B2 | * | 5/2009  | Uehara et al. ................ 362/613 |
| 2003/0184990 | A1 | * | 10/2003 | Lin .............................. 362/31 |
| 2006/0221638 | A1 | * | 10/2006 | Chew et al. ................. 362/613 |
| 2008/0205081 | A1 | * | 8/2008  | Ijzerman et al. ............. 362/616 |

FOREIGN PATENT DOCUMENTS

| JP | 10-082915 | 3/1998 |
| JP | 2578529   | 8/1998 |

* cited by examiner

*Primary Examiner*—Stephen F Husar
*Assistant Examiner*—James W Cranson
(74) *Attorney, Agent, or Firm*—The Nath Law Group; Jerald L. Meyer; Robert T. Burns (57) ABSTRACT

A lighting device includes a plurality of light-transmitting guide plates 1, 2, 3 laminated in at least three layers and a plurality of light emitting elements 4, 5, 6 arranged so as to oppose to respective lateral sides of the light-transmitting guide plates 1, 2, 3 to allow luminance flux in different color with respect to each light-transmitting guide plate to be incident on the corresponding light-transmitting guide plate. Each of the light-transmitting guide plates 1, 2, 3 has a plurality of reflecting surfaces 7, 8, 9 formed on the backside of the plate to change a propagation direction of the luminance flux propagated in the each light-transmitting guide plate, allowing the luminance flux, of which propagation direction has been changed by the reflecting surfaces 7, 8, 9, to be emitted from the front side of the each light-transmitting guide plates.

4 Claims, 7 Drawing Sheets

LIGHTING DEVICE AND DISPLAY DEVICE

BACKGROUND OF THE INVENTION

1. Field of the Invention

The present invention relates to a lighting device having a surface light source device and a light guide plate, and a display device having the lighting device. More particularly, the invention relates to a lighting device using a number of point light sources such as LED (light emitting diode), and a display device having the lighting device as a surface light source device.

2. Description of Related Art

There has been proposed a display device configured to display an image by illuminating a spatial light modulating element, such as LCD (liquid crystal display), using a lighting device.

Figure 1:
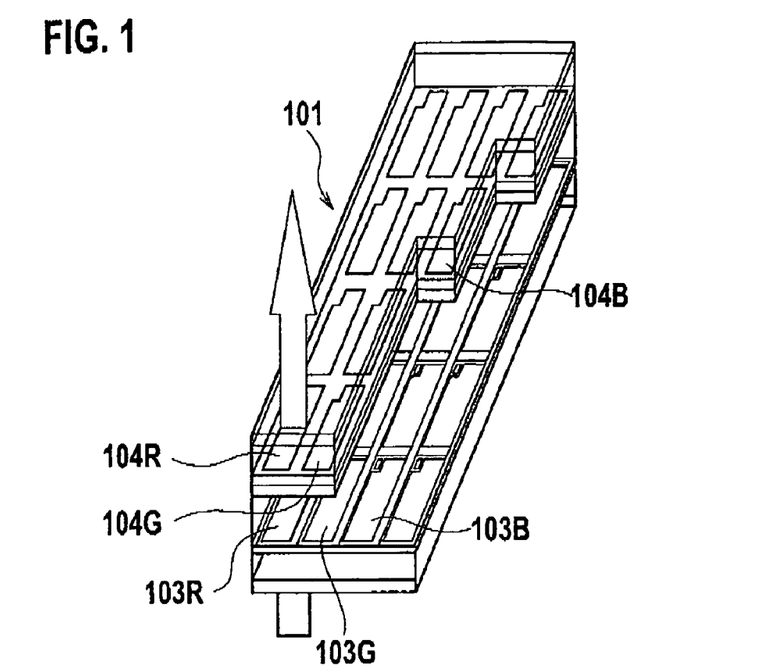
FIG. 1 is a perspective view showing the constitution of a display device using a conventional transmission TFT-LCD (thin film transistor-liquid crystal display)

FIG. 1 is a perspective view showing the constitution of a display device using a conventional transmission TFT-LCD (thin film transistor-liquid crystal display)

Figure 2:
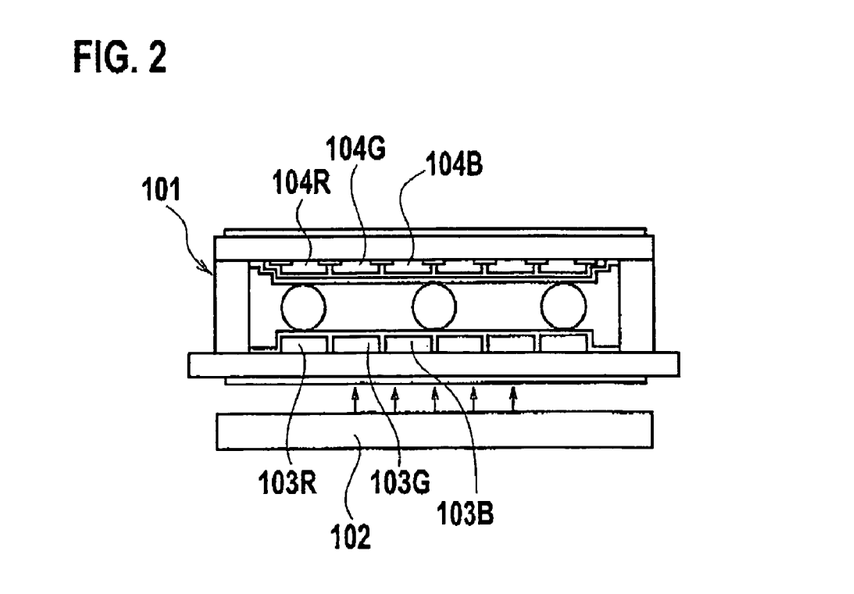
FIG. 2 is a sectional view of the display device of FIG. 1.

FIG. 2 is a sectional view of the display device of FIG. 1.

In the display device using a non-illuminant spatial light modulating element represented by LCD, as shown in FIGS. 1 and 2, a lighting device (backlight unit) 102 is arranged on the backside of the spatial light modulating element 101. White illumination light emitted from the lighting device 102 enters picture electrodes (transparent electrodes) for red 103R, picture electrodes for green 103G and picture electrodes for blue 103B. The illumination light via the picture electrodes for respective colors is further transmitted through color filters for respective colors 104R, 104G and 104B to be red light, green light and blue light, respectively. Then, these color lights are combined to a color image for display.

As a lighting device for such a display device, for example, there is known a so-called "direct type" lighting device having a light source and a diffuser plate of which backside is opposed to the light source. In this lighting device, illumination light emitted from the light source enters the diffuser plate through its backside. Then, the illumination light emitted from the front side of the diffuser plate enters the spatial light modulating element.

As another lighting device for the display device, for example, there is also known a so-called "edge light type" lighting device having a light source and a light guide plate of which lateral side is opposed to the light source. In this lighting device, illumination light emitted from the light source enters the light guide plate through its lateral side. Then, the, illumination light from the front side of the light guide plate enters the spatial light modulating element. The illumination light transmitted to the backside of the light guide plate is reflected by a reflection sheet (reflector) and returned into the light guide plate again.

Also, the lighting device may be provided, on the front side (i.e. emitting surface) of the diffuser plate or the light guide plate, with a prism lens sheet for condensing the illumination light emitted from the front side within a view angle to thereby improve brightness or a second diffuser plate (or diffuser sheet) for equalizing brightness.

As a light source in such a lighting device, there is employed a light emitting element, such as cold cathode lamp etc. forming a linear light source and LED forming a point light source. In case of light emitting elements as the light source, a plurality of light emitting elements are arranged apart from each other so as to oppose to an incident surface (backside or lateral side) of the diffuser plate or the light guide plate, as disclosed in Japanese Utility Model Registration No. 2578529 (Citation 1) and Japanese Patent Laid-Open Publication No. 10-82915 (Citation 2).

In the lighting devices of Citation 1 and Citation 2, in order to facilitate the positioning of the light emitting elements with respect to the diffuser plate (or the light guide plate), it is provided with recesses for fitting the light emitting elements. With the engagement between the recesses and the light emitting elements, they are arranged in position against the diffuser plate (or the light guide plate).

SUMMARY OF THE INVENTION

In the above-described lighting devices for the display device, if the light source is formed by a plurality of light emitting elements in line, then resultant illumination light emitted from the diffuser plate or the light guide plate is apt to cause luminance unevenness in proportion to an interval between the diffuser plate (or light guide plate) and the light emitting elements. Particularly, the larger an interval between the adjoining light emitting elements gets, the more remarkable the luminance unevenness becomes. For this reason, it is difficult to improve both manufacturing facility and saving of manufacturing cost of the lighting device with reduction in the number of light emitting elements due to the impossibility of broadening an interval between the adjoining light emitting elements.

Additionally, if adopting red light emitting elements, green light emitting elements and blue light emitting elements as the light emitting elements, then a thick diffuser plate (or light guide plate) or a light mixing chamber having is required in order that respective color lights are sufficiently mixed with each other to produce white light composed of respective color lights. The adoption of such a diffuser plate (or light guide plate) or the light mixing chamber would cause the display device to be large-sized.

Even if producing white illumination light with less luminance unevenness with the use of a thick diffuser plate (or light guide plate) or the light mixing chamber, the illumination light is obtained due to transmission through a color filter for selecting only specific color (e.g. red, green or blue) component. In transmitting, as two-third components are absorbed by the color filter, the amount of illumination light for image displaying is reduced less than one-third of its original amount Due to such a loss of illumination light, greater number of light emitting elements are required to produce a display image having a required luminance. Therefore, it is difficult to improve both manufacturing facility and saving of manufacturing cost of the lighting device with reduction in the number of light emitting elements.

Under the above-mentioned problems, an object of the present invention is to provide a lighting device using red, green and blue light emitting elements as the light source, which device is capable of preventing loss of illumination light caused by a color filter, improving both manufacturing facility and saving of manufacturing cost of the lighting device with reduction in the number of light emitting elements while maintaining the required luminance, and also miniaturizing its own size.

Another object of the present invention is to provide a display device capable of effecting appropriate color reproduction originating in nonuse of color filters while providing a display image with high luminance, and also miniaturizing its own size.

In order to achieve the above objects, there is provided a lighting device comprising: a plurality of light-transmitting guide plates laminated in three or more layers; and a plurality of light emitting elements opposed to respective lateral sides of the light-transmitting guide plates to thereby emit light fluxes in different colors to the light-transmitting guide plates respectively, wherein each of the light-transmitting guide plates is provided, on a backside thereof with a plurality of reflecting surfaces that change a propagation direction of the light flux propagated in the each light-transmitting guide plate to thereby emit the light flux from a front side of the each light-transmitting guide plate.

According to a second aspect of the invention, there is also provided a display comprising: a plurality of light-transmitting guide plates laminated in three or more layers, the light-transmitting guide plates including, at least, a first light-transmitting guide plate, a second light-transmitting guide plate and a third light-transmitting guide plate; a plurality of light emitting elements opposed to respective lateral sides of the light-transmitting guide plates to thereby emit light fluxes in three primary colors to the light-transmitting guide plates respectively; a plurality of reflecting surfaces formed on the backside of each of the light-transmitting guide plates to change a propagation direction of the light flux propagated in the each light-transmitting guide plate, thereby emitting the light flux from a front side of the each light-transmitting guide plate; and a spatial light modulating element arranged so as to oppose the front sides of the light-transmitting guide plates, wherein the light flux in a first color forming the three primary colors emitted from the first light-transmitting guide plate is adapted so as to be incident on pixels of the spatial light modulating element corresponding to the first color, the light flux in a second color forming the three primary colors emitted from the second light-transmitting guide plate is adapted so as to be incident on pixels of the spatial light modulating element corresponding to the second color, and the light flux in a third color forming the three primary colors emitted from the third light-transmitting guide plate is adapted so as to be incident on pixels of the spatial light modulating element corresponding to the third color, whereby displaying of a color image can be effected by the light fluxes in the three primary colors incident on the pixels corresponding to the first, second and the third colors.

According to a third aspect of the invention, there is also provided a lighting device comprising: three or more light-transmitting guide bodies arranged in parallel to each other; a plurality of light emitting elements opposed to respective one ends of the light-transmitting guide bodies to thereby emit light fluxes in different colors to the light-transmitting guide bodies respectively; a plurality of reflecting surfaces formed in each of the light-transmitting guide bodies to change a propagation direction of the light flux propagated in the each light-transmitting guide body, thereby emitting the light flux from a lateral surface of the each light-transmitting guide body; a light-transmitting guide plate assembly arranged beside the light-transmitting guide bodies so as to allow the light fluxes emitted therefrom to be incident on a lateral side of the light-transmitting guide plate assembly and further emit the light fluxes from a front side thereof, the light-transmitting guide plate assembly having a plurality of light-transmitting guide plate juxtaposed to each other; and a spatial light modulating element arranged so as to oppose the front side of the light-transmitting guide plate assembly, wherein the reflecting surfaces are formed in the each light-transmitting guide body so that the light flux emitted from one light-transmitting guide body is transmitted through the other light-transmitting guide body's part where the reflecting surfaces are not formed, and further incident on the spatial light modulating element through the light-transmitting guide plate assembly.

According to a fourth aspect of the invention, there is also provided a display device comprising: three or more light-transmitting guide bodies arranged in parallel to each other; a plurality of light emitting elements opposed to respective one ends of the light-transmitting guide bodies to thereby emit light fluxes in different colors to the light-transmitting guide bodies respectively; a plurality of reflecting surfaces formed in each of the light-transmitting guide bodies to change a propagation direction of the light flux propagated in the each light-transmitting guide body, thereby emitting the light flux from a lateral surface of the each light-transmitting guide body; a light-transmitting guide plate assembly arranged beside the light-transmitting guide bodies so as to allow the light fluxes emitted therefrom to be incident on a lateral side of the light-transmitting guide plate assembly and further emit the light fluxes from a front side thereof, the light-transmitting guide plate assembly having a plurality of light-transmitting guide plate juxtaposed to each other; and a spatial light modulating element arranged so as to oppose the front side of the light-transmitting guide plate assembly, wherein the reflecting surfaces are formed in the each light-transmitting guide body so that the light flux emitted from one light-transmitting guide body is transmitted through the other light-transmitting guide body's part where the reflecting surfaces are not formed, and further incident on the spatial light modulating element through the light-transmitting guide plate assembly.

According to a fifth aspect of the invention, there is also provided a display device comprising: three or more light-transmitting guide bodies arranged in parallel to each other, the light-transmitting guide bodies including, at least, a first light-transmitting guide body, a second light-transmitting guide body and a third light-transmitting guide body; a plurality of light emitting elements opposed to respective one ends of the light-transmitting guide bodies to thereby emit light fluxes in three primary colors to the light-transmitting guide bodies respectively; a plurality of reflecting surfaces formed in each of the light-transmitting guide bodies to change a propagation direction of the light flux propagated in the each light-transmitting guide body, thereby emitting the light flux from a lateral surface of the each light-transmitting guide body; a light-transmitting guide plate assembly arranged beside the light-transmitting guide bodies so as to allow the light fluxes emitted therefrom to be incident on a lateral side of the light-transmitting guide plate assembly and further emit the light fluxes from a front side thereof, the light-transmitting guide plate assembly having a plurality of light-transmitting guide plate juxtaposed to each other; and a spatial light modulating element arranged so as to oppose the front side of the light-transmitting guide plate assembly, wherein the light flux in a first color forming the three primary colors emitted from the first light-transmitting guide body is adapted so as to be incident on pixels of the spatial light modulating element corresponding to the first color through the second and third light-transmitting guide bodies' parts where the reflecting surfaces are not formed and the light-transmitting guide plate assembly, the light flux in a second color forming the three primary colors emitted from the second light-transmitting guide body is adapted so as to be incident on pixels of the spatial light modulating element corresponding to the second color through the third light-transmitting guide body's part where the reflecting surfaces are not formed and the light-transmitting guide plate assembly, and the light flux in a third color forming the three primary colors emitted from the third light-transmitting guide body is adapted so as to be incident on pixels of the spatial light modulating element corresponding to the third color through the light-transmitting guide plate assembly, whereby displaying of a color image can be effected by the light fluxes in the three primary colors incident on the pixels corresponding to the first, second and the third colors.

DETAILED DESCRIPTION OF THE PREFERRED EMBODIMENT

There will be described preferred embodiments of the present invention with reference to drawings.

1st. Embodiment (Lighting Device)

Figure 3:
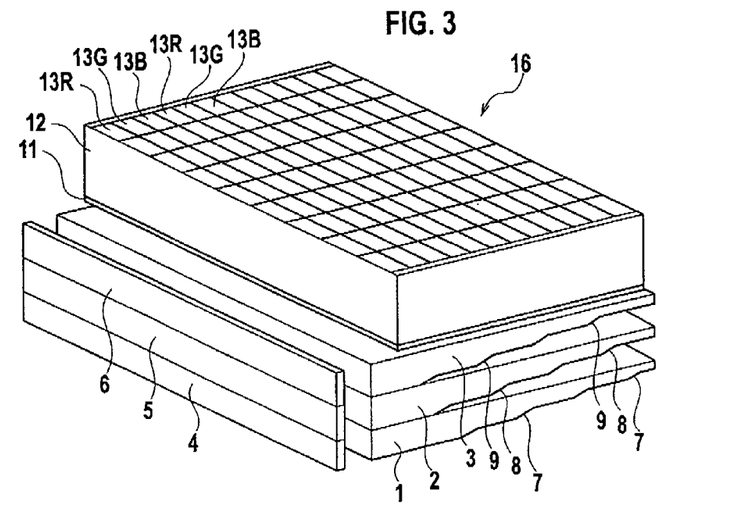
FIG. 3 is a perspective view showing the constitution of a lighting device and a display device in accordance with a first embodiment of the present invention.

FIG. 3 is a perspective view showing the constitution of a lighting device and a display device in accordance with the present invention.

As shown in FIG. 3, the lighting device of the present invention includes a plurality of light-transmitting guide plates laminated in at least three layers. In this embodiment, the lighting device includes first, second and third light-transmitting guide plates 1, 2 and 3 in lamination. In arrangement, the second light-transmitting guide plate 2 is overlaid on the front side of the first light-transmitting guide plate 1, while the third light-transmitting guide plate 3 is overlaid on the front side of the second light-transmitting guide plate 2.

The first to third light-transmitting guide plates 1, 2 and 3 are formed to be flat plates of transparent material and laminated in parallel with each other. When forming a display device by use of this lighting device and a spatial light modulating element, each of the guide plates 1, 2 and 3 is formed with a principal surface generally equal to a display surface of the spatial light modulating element in size and shape.

The lighting device further includes a plurality of light sources 4, 5 and 6 opposed to the lateral sides (incident surfaces) of the light-transmitting guide plates 1, 2 and 3. Each of the first to third light sources 4, 5 and 6 comprises a plurality of light emitting elements, respectively. In detail, each light source 4 (5 or 6) has a plurality of light emitting elements (e.g. LED chips forming a LED array source) arranged apart from each other on a substrate. Note, semiconductor laser may be available for the light emitting element.

Figure 4:
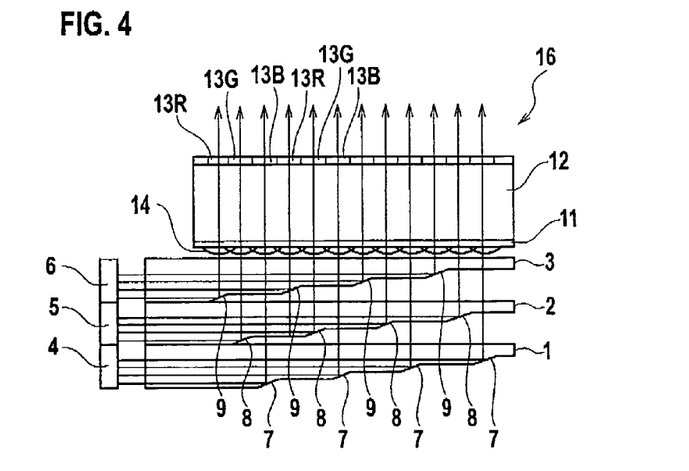
FIG. 4 is a side view of the lighting device and the display device of FIG. 3.

FIG. 4 is a side view showing the constitution of the lighting device and a display device in accordance with the present invention.

As shown in FIG. 4, these light sources 4, 5 and 6 emit respective light fluxes (illumination light) of which colors vary from the light-transmitting guide plate 1 to the light-transmitting guide plate 3, to allow the light fluxes to be incident on the corresponding light-transmitting guide plates 1, 2 and 3, respectively. That is, the first light source 4 allows the light flux in a first color (e.g. red) to be incident on the lateral side (incident surface) of the first light-transmitting guide plate 1 into its interior side. Also, the second light source 5 allows the light flux in a second color (e.g. green) to be incident on the lateral side (incident surface) of the second light-transmitting guide plate 2 into its interior side. The third light source 6 allows the light flux in a third color (e.g. blue) to be incident on the lateral side (incident surface) of the third light-transmitting guide plate 3 into its interior side.

Respective light fluxes from the light sources 4, 5 and 6, which are parallel fluxes to each other, are incident on the lateral sides (incident surfaces) of the light-transmitting guide plates 1, 2 and 3 perpendicularly and propagated therein in a parallel direction to the main surfaces of the plates 1, 2 and 3.

Desirably, the light-transmitting guide plates' portions except the lateral sides (incident surfaces) are covered with not-shown reflectors or high reflecting members, such as silver taping member or white taping member.

Each of the light-transmitting guide plates 1, 2 and 3 has a plurality of reflecting surfaces 7, 8 and 9 formed on the backside to change a propagation direction of the light flux propagated in each light-transmitting guide plate. Thus, the light-transmitting guide plates 1, 2 and 3 serve to change the propagation direction of the light fluxes inside the plates 1, 2 and 3 due to the reflection on the reflecting surfaces 7, 8 and 9 and subsequently allow the so-reflected light fluxes to be emitted from the front side of the light-transmitting guide plates 1, 2 and 3. These reflecting surfaces 7, 8 and 9 are provided by inclining predetermined portions of the light-transmitting guide plates 1, 2 and 3 on the backside to the horizontal direction, respectively. Thus, the light fluxes propagated in the light-transmitting guide plates 1, 2 and 3 are polarized due to their internal reflections on the reflecting surfaces 7, 8 and 9. As shown in FIG. 4, each of the light-transmitting guide plates 1, 2 and 3 is formed so that its thickness has a maximum on the side of the incident surface of the light flux and is gradually reduced as being propagated against the leading reflecting surface 7 (8 or 9) in the propagation direction of light flux(es).

Figure 5:
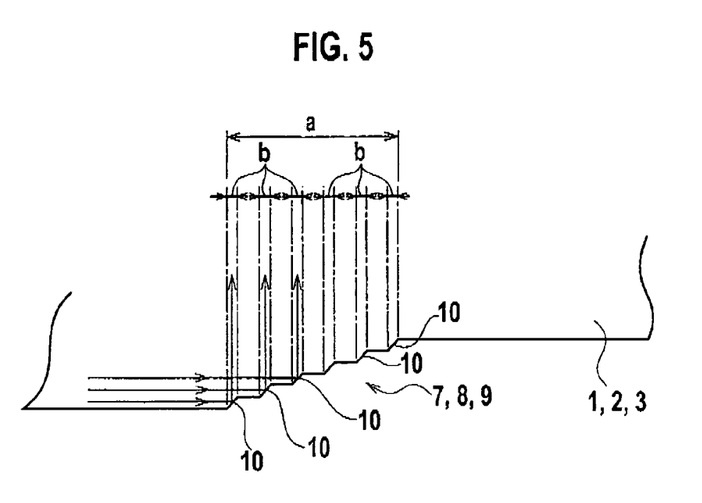
FIG. 5 is a side view showing the profile of a reflecting surface forming the essential part of a light-transmitting guide plate of the lighting device of FIG. 3.

FIG. 5 is a side view showing one reflecting surface as being an essential part of the light-transmitting guide plate forming the lighting device of the present invention.

In common with the light-transmitting guide plates 1, 2 and 3, as shown in FIG. 5, each of the reflecting surfaces 7 (8 or 9) comprises a plurality of slanted surfaces 10 arranged on a predetermined inclined surface in sequence. Each slanted surface 10 is slanted to the main surface of the relevant light-transmitting guide plate 1 (2 or 3) at 45 degrees. Interposed between one slanted surface 10 and the adjoining slanted surface 10 is a straight surface that is parallel to the main surface of the relevant light-transmitting guide plate 1 (2 or 3), in other words, the propagation direction of light flux(es). In operation, the light flux emitted from each light source 4 (5 or 6) and further incident on the relevant light-transmitting guide plate 1 (2 or 3) is reflected and polarized on the slanted surfaces 10 of each reflecting surface 7 (8 or 9) at 90 degrees in the propagation direction and finally emitted from the plate 1 (2 or 3) perpendicularly to the main surface (emitting surface) on the front side.

In each reflecting surface 7 (8 or 9), it is established that the ratio (nb/a: occupancy ratio) of an overall projected area nb (a: number of slanted surfaces 10 in each reflecting surface) of the respective slanted surfaces 10 in the emitting (light outgoing) direction of light flux to a projected area a of the whole reflecting surface 7 (8 or 9) in the emitting direction is about 15%.

As shown in FIG. 4, the light flux (part) incident on the first light-transmitting guide plate 1, which has been emitted from the first light source 4 and propagated in the plate 1 straightly without being reflected by a certain reflecting surface 7, is reflected by the other reflecting surface 7 to thereby change the propagation direction by 90 degrees. Thus, the whole light flux emitted from the first light source 4 is reflected by the multiple reflecting surfaces 7 in turn, effecting a polarization of 90 degrees in the propagation direction.

Similarly, the light flux (part) incident on the second light-transmitting guide plate 2, which has been emitted from the second light source 5 and propagated in the plate 2 straightly without being reflected by a certain reflecting surface 8, is reflected by the other reflecting surface 8 to thereby change the propagation direction by 90 degrees. Thus, the whole light flux emitted from the second light source 5 is reflected by the multiple reflecting surfaces 8 in turn, effecting a polarization of 90 degrees in the propagation direction.

Still further, the light flux (part) incident on the third light-transmitting guide plate 3, which has been emitted from the third light source 6 and propagated in the plate 3 straightly without being reflected by a certain reflecting surface 9, is reflected by the other reflecting surface 9 to thereby change the propagation direction by 90 degrees. Thus, the whole light flux emitted from the third light source 6 is reflected by the multiple reflecting surfaces 9 in turn, effecting a polarization of 90 degrees in the propagation direction.

The light flux polarized at 90 degrees in the propagation direction by the first light-transmitting guide plate 1 is emitted from the main surface (emitting surface) on the front side of the plate 1. Then, the same light flux is transmitted through the second and third light-transmitting guide plates 2 and 3 and finally emitted from the front side of the third light-transmitting guide plate 3. It should be noted that neither the reflecting surfaces 8 of the second light-transmitting guide plate 2 nor the reflecting surfaces 9 of the third light-transmitting guide plate 3 are present on the optical path of the light flux emitted from the first light-transmitting guide plate 1. In other words, the reflecting surfaces 7, 8 and 9 of the light-transmitting guide plates 1, 2 and 3 are formed apart from the lateral sides (incident surfaces) of the light-transmitting guide plates 1, 2 and 3 at different distances from each other.

The light flux polarized at 90 degrees in the propagation direction by the second light-transmitting guide plate 2 is emitted from the main surface (emitting surface) on the front side of the plate 2. Then, the same light flux is transmitted through the third light-transmitting guide plate 3 and finally emitted from the front side of the third light-transmitting guide plate 3. It should be also noted that neither the reflecting surfaces 9 of the third light-transmitting guide plate 3 are not present on the optical path of the light flux emitted from the second light-transmitting guide plate 2.

The light flux polarized at 90 degrees in the propagation direction by the third light-transmitting guide plate 3 is emitted from the main surface (emitting surface) on the front side of the plate 3. In this way, on the front side of the third light-transmitting guide plate 3, there are emitted the respective light fluxes whose propagation directions have been polarized at 90 degrees by the light-transmitting guide plates 1, 2 and 3 respectively, at different positions from each other.

In the lighting device, the light-transmitting guide plates 1, 2 and 3 may be easily produced by means of any of extrusion, pressing and injection molding using thermoplastic resin. Namely, the light-transmitting guide plates 1, 2 and 3 can be easily produced in general forming processes adopting molding dies, including the reflecting surfaces 7, 8 and 9 each composed of the slanted surfaces 10 integrally. In forming the light-transmitting guide plates 1, 2 and 3, the reflecting surfaces 7, 8 and 9 are formed apart from the lateral sides (incident surfaces) of the light-transmitting guide plates 1, 2 and 3 at different distances from each other. The above-mentioned lighting device is completed by arranging the so-formed light-transmitting guide plates 1, 2 and 3 to overlap each other in sequence while aligning respective lateral sides of the plates 1, 2 and 3 with each other.

(Display Device)

The display device using the above-mentioned lighting device will be described below. In this display device, the light fluxes emitted from the front side of the third light-transmitting guide plate 3 are incident on a liquid crystal display element (transmission TFT-LCD) 16 as the spatial light modulating element, as shown in FIGS. 3 and 4. Although the illustrated liquid crystal display element 16 is provided with a polarizing filter 11 on the incident side, a sealing glass 12 and picture (transparent) electrodes 13R, 13G and 13B on the emission side, the same element 16 further includes a not-shown liquid crystal layer formed on the front side of the electrodes 13R, 13G and 13B. This liquid crystal layer is sealed up with the sealing glass 12 (on the incident side of light fluxes) and a not-shown sealing glass (on the emission side of light fluxes).

In order to effect color displaying in this display device, a first color of three primary colors (e.g. red) is allocated for the light flux emitted from the first light source 4 of the lighting device, a second color (e.g. green) for the light flux from the second light source 5, and a third color (e.g. blue) is allocated for the light flux emitted from the third light source 6.

The light flux in the first color emitted from the first light-transmitting guide plate 1 enters the picture electrodes 13R in charge of the first color in the liquid crystal display element 16 through the polarizing filter 11 and the sealing glass 12 on the incident side. Similarly, the light flux in the second color emitted from the second light-transmitting guide plate 2 enters the picture electrodes 13G in charge of the second color in the liquid crystal display element 16 through the polarizing filter 11 and the sealing glass 12 on the incident side. The light flux in the third color emitted from the third light-transmitting guide plate 3 enters the picture electrodes 13B in charge of the third color in the liquid crystal display element 16 through the polarizing filter 11 and the sealing glass 12 on the incident side.

In this way, the light fluxes in respective colors are incident on the picture electrodes 13R, 13G and 13B with respect to each color and are subjected to polarization modulation with respect to each pixel since the light fluxes are transmitted through the liquid crystal layer (parts) corresponding to the picture electrodes 13R, 13G and 13B. After the polarization modulation, the light fluxes are emitted from the sealing glass 12 on the emission side in front. On the front side of the sealing glass 12, the light fluxes are emitted with respective intensity modulated as a result of filtering out an emission-side polarizing filter having its optical axis perpendicular to that of the incident-side polarizing filter 11. The color displaying is effected since the intensity of each light flux of respective colors is modulated with respect to each pixel.

Preferably, the polarizing filter 11 on the incident side is formed, on its incident surface for the light fluxes, with a cylindrical-lens (or microlens) array 14, as shown in FIG. 4. This cylindrical-lens (or microlens) array 14 includes a plurality of cylindrical lenses (or microlenses) set in array where bus lines (generatrices) of respective cylindrical lenses (or microlenses) are perpendicular to the incident direction of light fluxes from the light sources 4, 5 and 6 incident on the light-transmitting guide plates 1, 2 and 3. By the cylindrical-lens (or microlens) array 14, the light fluxes emitted from the lighting device are converges in the above incident direction once and thereafter, the light fluxes are incident on the corresponding picture electrodes 13R, 13G and 13B with diffusion in the same direction (i.e. the incident direction of light fluxes from the light sources 4, 5 and 6 on the light-transmitting guide plates 1, 2 and 3). As the light fluxes through the picture electrodes 13R, 13G and 13B continue to be diffused furthermore, the view angle (i.e. angular range with which a display image becomes visible) can be broadened furthermore.

Instead, the cylindrical-lens (or microlens) array 14 may be arranged on the front side (emission side) of the third light-transmitting guide plate 3. Alternatively, the cylindrical-lens (or microlens) array 14 may be provided in both the polarizing filter 11 and the third light-transmitting guide plate 3.

Figure 6:
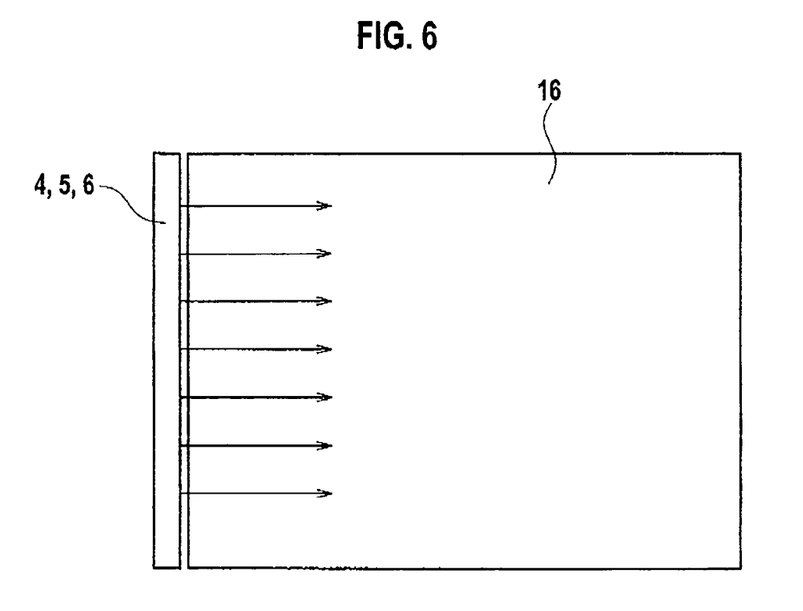
FIG. 6 is a front view showing the constitution of the display device of FIG. 3.

FIG. 6 is a front view of the display device of the present invention.

As shown in FIG. 6, when the display device has a rectangular display screen (i.e. display area of the spatial light modulating element—the liquid crystal element 16), it is desirable the light sources 4, 5 and 6 are arranged on either short side of the display screen. The reason of such an arrangement is that if the light sources 4, 5 and 6 were arranged along a long side of the display screen, the number of light emitting elements forming the light sources 4, 5 and 6 had to be increased.

Figure 7:
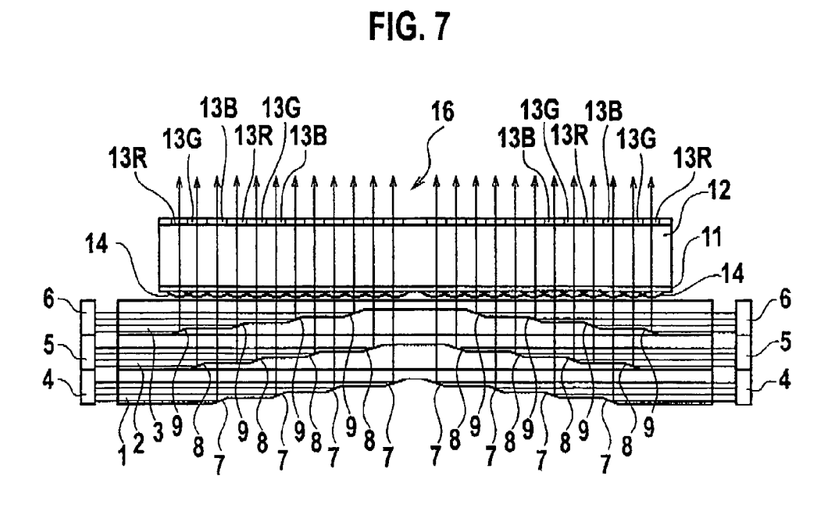
FIG. 7 is a side view showing another example of the display device of FIG. 3.

FIG. 7 is a side view showing another example of the display device of the display device.

In this display device, as shown in FIG. 7, the light sources 4, 5 and 6 are arranged along both sides of the display screen. In order to allow the light fluxes to be incident on both lateral sides of each light-transmitting guide plate 1 (2 or 3), two pairs of assemblies each composed of the light-transmitting guide plates 1, 2 and 3 of the previous lighting device are arranged in parallel so as to oppose to each other.

In the display device constructed above, there is no need of constantly operating all of light emitting elements in each of the light sources 4, 5 and 6. Assume each of the light sources 4, 5 and 6 comprises n light emitting elements (number: n). Then, by controlling respective drive signals for activating the respective light emitting elements, they are sequentially lightened every three light emitting elements (i.e. one element with respect to each light source) for a predetermined period resulting from a division of one frame time of the display screen image by the number of light emitting elements n. Thus, by lighting up all (n×3) of the light emitting elements within one frame time, it is possible to allow the lighting device to scan a linear segment to be illuminated by the lighting device.

Further, by synchronizing the linear segment illuminated by the lighting device with a write line along which image data is written by a pixel circuit of the liquid crystal element 16 in line sequence, the image displaying can be accomplished by line scanning.

2nd. Embodiment of Lighting Device

Figure 8:
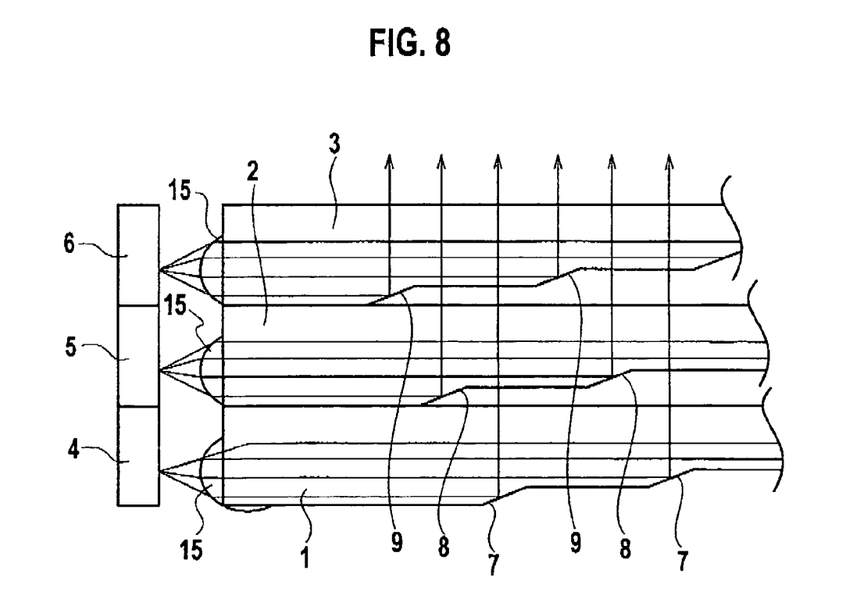
FIG. 8 is a side view showing the essential part of a lighting device in accordance with a second embodiment of the present invention.

FIG. 8 is a side view showing the essential part of the lighting device in accordance with the second embodiment of the present invention.

According to the second embodiment, as shown in FIG. 8, cylindrical lenses (or microlenses) 15 are formed on respective lateral surfaces of the light-transmitting guide plates 1, 2 and 3 on which the light fluxes from the light sources 4, 5 and 6 are incident. By the cylindrical lenses (or microlenses) 15, the light fluxes from the light sources 4, 5 and 6 can be modified to high-accuracy parallel fluxes in the light-transmitting guide plates 1, 2 and 3, improving the light utilization efficiency of the light fluxes from the light sources 4, 5 and 6. In addition, the intensity distribution of the light fluxes emitted from the lighting device in front side is uniformed to allow the emitted light to be reduced in luminance unevenness.

Desirably, the cylindrical lenses (or microlenses) 15 are formed by aspherical cylindrical lenses (or microlenses) optimized in accordance with emission distribution angles of the light emitting elements of the light sources 4, 5 and 6. Of course, the light-transmitting guide plates 1, 2 and 3 can be easily produced in integral with the cylindrical lenses (or microlenses) 15 by a general forming step adopting a molding die.

In common with the first and second embodiments, as the light-transmitting guide plates emit the light fluxes, of which propagation directions have been changed by the reflecting surfaces, in front, the light fluxes in different colors for every light-transmitting guide plates are emitted toward different positions corresponding to respective positions of the reflecting surfaces without being mixed with each other.

Therefore, according to the lighting device of the first and second embodiments, it is possible to allow illumination light in designated color to be incident on a predetermined pixel in the spatial light modulating element without using a color filter. Thus, as there is no loss of illumination light caused by using the color filter, it is possible to accomplish both manufacturing facility and cost saving of the lighting device with reduction in the number of light emitting elements while maintaining the required luminance. Further, it is possible to save the power consumption of the lighting device. By reducing the thicknesses of the light-transmitting guide plates, it is also possible to miniaturize the lighting device.

In the display device of the first and second embodiments, similarly, the light flux in a first color (e.g. red) forming three primary colors, which has been emitted from the first light-transmitting guide plate 1, is incident on the picture electrodes pixels) 13R of the liquid crystal display element (spatial light modulating element) 16 corresponding to the first color. The light flux in a second color (e.g. green) forming three primary colors, which has been emitted from the second light-transmitting guide plate 2, is incident on the picture electrodes 13G of the liquid crystal display element 16 corresponding to the second color. The light flux in a third color (e.g. blue) forming three primary colors, which has been emitted from the third light-transmitting guide plate 3, is incident on pixels of the liquid crystal element 16 corresponding to the third color. Then, displaying of a color image is effected by the light fluxes in the three primary colors incident on the pixels corresponding to the first, second and the third colors. Thus, as there is no loss of illumination light caused by using the color filter, it is possible to accomplish both manufacturing facility and cost saving of the display device with reduction in the number of light emitting elements while maintaining the required luminance. Further, it is possible to save the power consumption of the display device. By reducing the thicknesses of the light-transmitting guide plates, it is also possible to miniaturize the display device.

(Practical Example of Display Device)

Experimentally, we have manufactured a display device of the embodiment with the use of LED-array light sources as the light sources 4, 5 and 6. In the display device, the emission distribution angles of respective LED chips forming the LED-array light sources are approx. 80 degrees (±40 degrees) in the horizontal direction (i.e. the arranging direction of LED chips) and 40 degrees (±20 degrees) in the vertical direction. Of course, the light-transmitting guide plates 1, 2 and 3 are formed, on their lateral sides, with the cylindrical lenses (or microlenses) 15.

Under condition that the light fluxes in red, green and blue having 40 lm (lumen) in illuminance each are emitted from the light sources 4, 5 and 6, the whole light-flux intensity incident on the spatial light modulating element (the liquid crystal display element 16) was 79.28 lm. In consequence, the maximum light utilization efficiency (=overall intensity of incident light fluxes on the liquid crystal display element/ overall intensity of light fluxed emitted from the light sources) was 66.1% [by calculation 79.28/(40×3)=0.661], which is on a level with the maximum light utilization efficiency of the conventional lighting device for liquid crystal display element. As the display device of the embodiment has no absorption of light due to color filters, which is incidental to the conventional lighting device, it results in a maximum light utilization efficiency three times as much as the conventional lighting device has.

Therefore, when illuminating a transmission liquid crystal display element (TFT-LCD) with the use of the light device of the present invention, it is possible to reduce the number of light emitting elements required for a given illuminance to one-third of those of the conventional lighting device. In addition, it is also possible to reduce the power consumption to one-third of that of the conventional lighting device. Also, it is possible to reduce respective thicknesses of the light-transmitting guide plates 1, 2 and 3 in comparison with the conventional lighting device.

3$^{rd}$. Embodiment of Lighting Device

Figure 9:
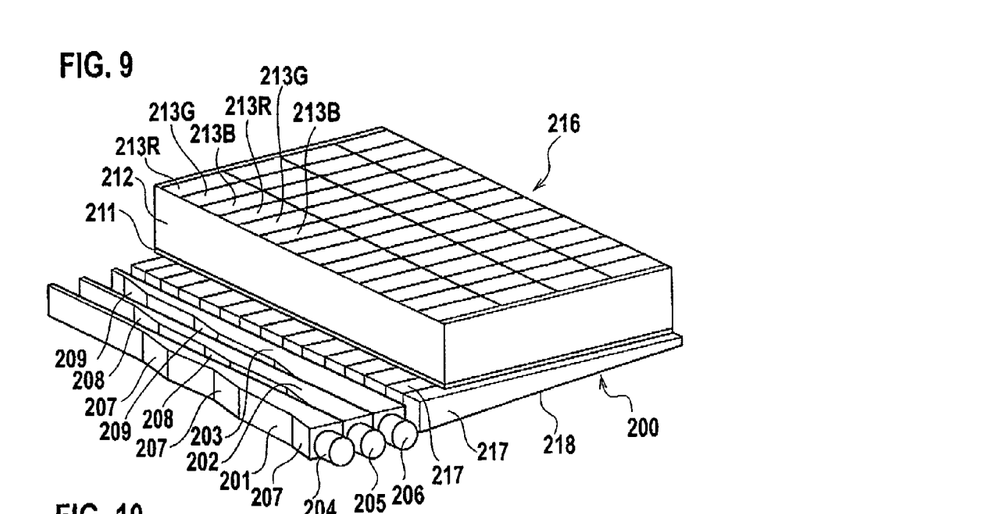
FIG. 9 is a perspective view showing the constitution of a lighting device and a display device in accordance with a third embodiment of the present invention.

FIG. 9 is a perspective view showing the constitution of the lighting device and the display device in accordance with the third embodiment of the present invention.

As shown in FIG. 9, the lighting device of the present invention includes a plurality of (at least three) rod-shaped light-transmitting guide bodies arranged in parallel with each other. In this embodiment, the lighting device includes first, second and third light-transmitting guide bodies 201, 202 and 203 juxtaposed to each other. In arrangement, the second light-transmitting guide body 202 is arranged on one lateral side of the first light-transmitting guide body 201, while the third light-transmitting guide body 203 is arranged on one lateral side of the second light-transmitting guide body 202.

The first to third light-transmitting guide bodies 201, 202 and 203 are rod-shaped to have rectangular cross sections and made of transparent material. These light-transmitting guide bodies 201, 202 and 203 are arranged in parallel with each other.

The lighting device further includes a plurality of light sources 204, 205 and 206 opposed to respective one ends (incident surfaces) of the light-transmitting guide bodies 201, 202 and 203. The first to third light sources 204, 205 and 206 comprise light emitting elements respectively. In detail, each light source 204 (205 or 206) comprises a light emitting element (e.g. LED chip etc.) forming a point light surface. Note, semiconductor laser may be available for the light emitting element.

Figure 10:
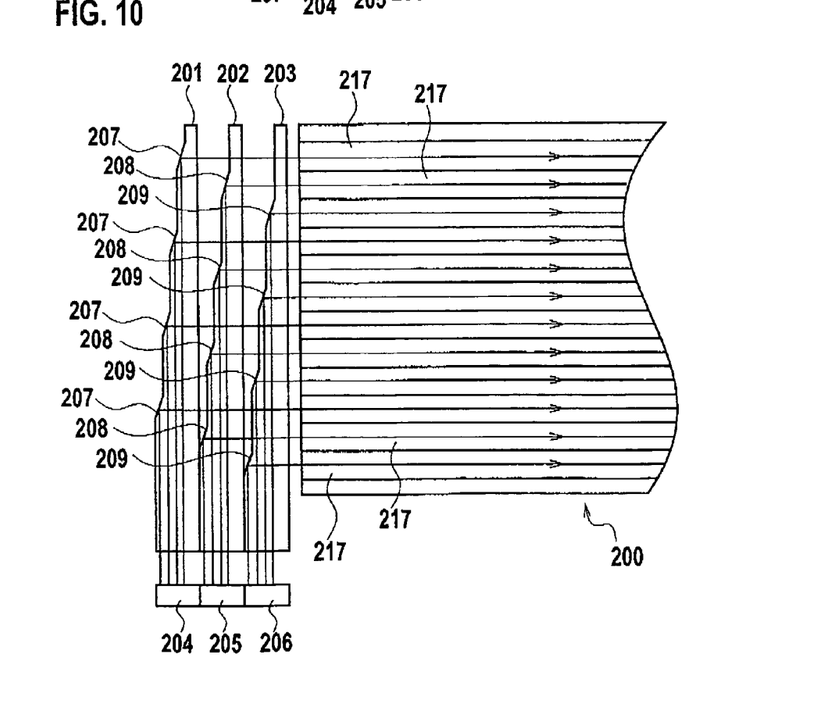
FIG. 10 is a front view of the lighting device of FIG. 9.

FIG. 10 is a front view showing the constitution of the lighting device in accordance with the present invention.

As shown in FIG. 10, these light sources 204, 205 and 206 emit respective light fluxes (illumination light) of which colors vary from the light-transmitting guide body 201 to the light-transmitting guide body 203, to allow the light fluxes to be incident on the corresponding light-transmitting guide bodies 201, 202 and 203, respectively. That is, the first light source 4 allows the light flux in a first color (e.g. red) to be incident on one end (incident surface) of the first light-transmitting guide body 201 into its interior side. Also, the second light source 205 allows the light flux in a second color (e.g. green) to be incident on one end (incident surface) of the second light-transmitting guide body 202 into its interior side. The third light source 206 allows the light flux in a third color (e.g. blue) to be incident on one end (incident surface) of the third light-transmitting guide body 203 into its interior side.

Respective light fluxes from the light sources 204, 205 and 206, which are parallel fluxes to each other, are incident on respective one ends (incident surfaces) of the light-transmitting guide bodies 201, 202 and 203 perpendicularly and propagated therein in a parallel direction to the lateral sides of the plates 201, 202 and 203.

Desirably, the light-transmitting guide bodies' portions except their ends (incident surfaces) and the above lateral sides (emitting surfaces) are covered with not-shown reflectors or high reflecting members, such as silver taping member or white taping member.

Each of the light-transmitting guide bodies 201, 202 and 203 has a plurality of reflecting surfaces 207, 208 and 209 formed on the other lateral sides to change a propagation direction of the light flux propagated in each light-transmitting guide body. Thus, the light-transmitting guide bodies 201, 202 and 203 serve to change the propagation direction of the light fluxes inside the bodies 201, 202 and 203 due to the reflection on the reflecting surfaces 207, 208 and 209 and subsequently allow the so-reflected light fluxes to be emitted from the lateral surfaces of the light-transmitting guide bodies 201, 202 and 203. These reflecting surfaces 207, 208 and 209 are provided by inclining predetermined portions of the light-transmitting guide bodies 201, 202 and 203 on the other lateral surfaces to the longitudinal direction of the bodies 201, 202 and 203, respectively. Thus, the light fluxes propagated in the light-transmitting guide bodies 201, 202 and 203 are polarized due to their internal reflections on the reflecting surfaces 207, 208 and 209. As shown in FIG. 10, each of the light-transmitting guide bodies 201, 202 and 203 is formed so that its thickness has a maximum on the side of the incident surface of the light flux and is gradually reduced as being propagated against the leading reflecting surface 207 (208 or 209) in the propagation direction of light flux(es).

Figure 11:
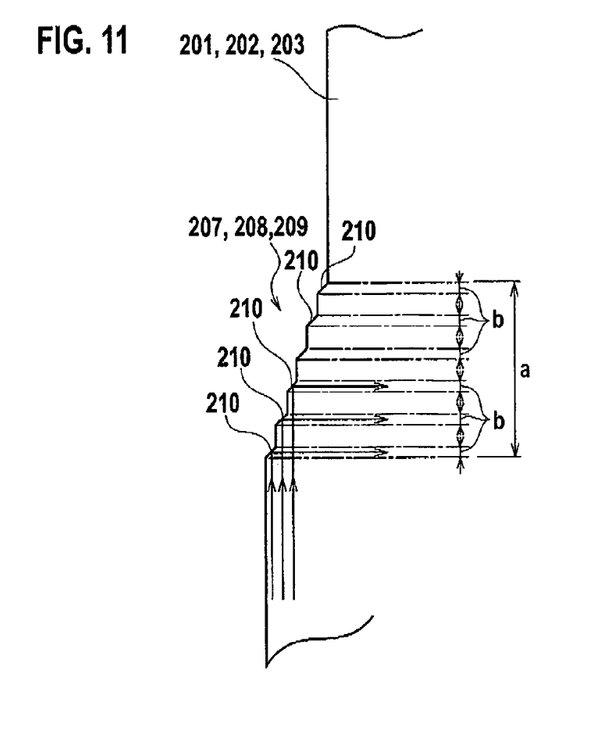
FIG. 11 is a side view showing the profile of a reflecting surface forming the essential part of a light-transmitting guide body of the lighting device of FIG. 9.

FIG. 11 is a front view showing one reflecting surface as being an essential part of the light-transmitting guide body forming the lighting device of the present invention.

In common with the light-transmitting guide bodies 201, 202 and 203, as shown in FIG. 11, each of the reflecting surfaces 207 (208 or 209) comprises a plurality of slanted surfaces 210 arranged on a predetermined inclined surface in sequence. Each slanted surface 210 is slanted to the other lateral surface of the relevant light-transmitting guide body 201 (202 or 203) at 45 degrees. Interposed between one slanted surface 210 and the adjoining slanted surface 210 is a straight surface that is parallel to the other lateral surface of the relevant light-transmitting guide body 201 (202 or 203), in other words, the propagation direction of light flux(es) or the longitudinal direction of the body 201 (202 or 203). In operation, the light flux emitted from each light source 204 (205 or 206) and further incident on the relevant light-transmitting guide body 201 (202 or 203) is reflected and polarized on the slanted surfaces 210 of each reflecting surface 207 (208 or 209) at 90 degrees in the propagation direction and finally emitted from the body 201 (202 or 203) perpendicularly to its one lateral surface (emitting surface).

In each reflecting surface 207 (208 or 209), it is established that the ratio (nb/a: occupancy ratio) of an overall projected area nb (n: number of slanted surfaces 210 in each reflecting surface) of the respective slanted surfaces 210 in the emitting (light outgoing) direction of light flux to a projected area a of the whole reflecting surface 207 (208 or 209) in the emitting direction is about 15%.

As shown in FIG. 11, the light flux (part) incident on the first light-transmitting guide body 201, which has been emitted from the first light source 204 and propagated in the body 201 straightly without being reflected by a certain reflecting surface 207, is reflected by the other reflecting surface 207 to thereby change the propagation direction by 90 degrees. Thus, the whole light flux emitted from the first light source 204 is reflected by the multiple reflecting surfaces 207 in turn, effecting a polarization of 90 degrees in the propagation direction.

Similarly, the light flux (part) incident on the second light-transmitting guide body 202, which has been emitted from the second light source 205 and propagated in the body 202 straightly without being reflected by a certain reflecting surface 208, is reflected by the other reflecting surface 208 to thereby change the propagation direction by 90 degrees. Thus, the whole light flux emitted from the second light source 205 is reflected by the multiple reflecting surfaces 208 in turn, effecting a polarization of 90 degrees in the propagation direction.

Still further, the light flux (part) incident on the third light-transmitting guide body 203, which has been emitted from the third light source 206 and propagated in the body 203 straightly without being reflected by a certain reflecting surface 209, is reflected by the other reflecting surface 209 to thereby change the propagation direction by 90 degrees. Thus, the whole light flux emitted from the third light source 206 is reflected by the multiple reflecting surfaces 209 in turn, effecting a polarization of 90 degrees in the propagation direction.

The light flux polarized at 90 degrees in the propagation direction by the first light-transmitting guide body 201 is emitted from its one lateral surface (emitting surface) on the front side of the body 201. Then, the same light flux is transmitted through the second and third light-transmitting guide bodies 202 and 203, and finally emitted from one lateral surface of the third light-transmitting guide body 203. It should be noted that neither the reflecting surfaces 208 of the second light-transmitting guide body 202 nor the reflecting surfaces 209 of the third light-transmitting guide body 203 are present on the optical path of the light flux emitted from the first light-transmitting guide body 201. In other words, the reflecting surfaces 207, 208 and 209 of the light-transmitting guide bodies 201, 202 and 203 are formed apart from the respective one ends (incident surfaces) of the light-transmitting guide bodies 201, 202 and 203 at different distances from each other.

The light flux polarized at 90 degrees in the propagation direction by the second light-transmitting guide body 202 is emitted from its one lateral surface (emitting surface). Then, the same light flux is transmitted through the third light-transmitting guide body 203 and finally emitted from the lateral surface of the third light-transmitting guide body 203. It should be also noted that neither the reflecting surfaces 209 of the third light-transmitting guide body 203 are not present on the optical path of the light flux emitted from the second light-transmitting guide body 202.

The light flux polarized at 90 degrees in the propagation direction by the third light-transmitting guide body 203 is emitted from the lateral surface (emitting surface). In this way, on the lateral surface of the third light-transmitting guide body 203, there are emitted the respective light fluxes whose propagation directions have been polarized at 90 degrees by the light-transmitting guide bodies 201, 202 and 203 respectively, at different positions from each other.

Figure 12:
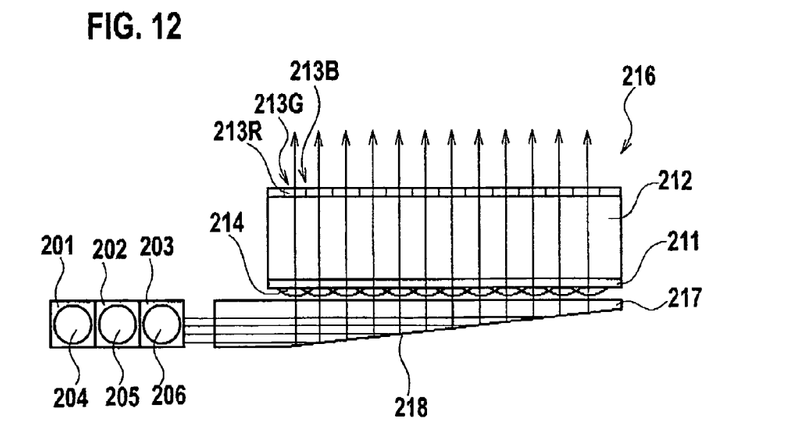
FIG. 12 is a side view showing the constitution of the lighting device and the display device of FIG. 9.

FIG. 12 is a side view showing the lighting device and the display device in accordance with the third embodiment of the present invention.

The light fluxes, which have been polarized at 90 degrees in the propagation direction by the light-transmitting guide bodies 201, 202 and 203 and further emitted from the lateral surface of the body 203, are incident on a light-transmitting guide plate assembly 200 through its lateral side. The light-transmitting guide plate assembly 200 comprises a plurality of light-transmitting guide plates 217 juxtaposed to each other and formed in integral with each other. Each of the light-transmitting guide plate 217 is in the form of a strip made from transparent material. Thus, the light-transmitting guide plate assembly 200 comprises a plurality of strips corresponding to the pixel arrays of identical colors in the spatial light modulating element. In manufacturing a display device with the use of the above lighting device and the spatial light modulating element, the light-transmitting guide plates 217 as a whole are arranged in an area whose size and shape are generally equal to those of a display surface of the spatial light modulating element.

In this embodiment, it is used the light-transmitting guide plate assembly 200 that integrates a plurality of light-transmitting guide plates 217 formed with a strip shape. It should be, however, noted here that it can be used other light-transmitting guide plate such as a piece of light-transmitting guide plate provided with a plurality of slits and thereby formed with a plurality of segmentations with a stripe shape.

The light-transmitting guide plates 217 have respective reflecting surfaces 218 formed on the backside to change the propagation direction of the light fluxes propagated in the plates 217. The light-transmitting guide plates 217 are provided to change the propagation direction of the light fluxes due to the reflection on the reflecting surfaces 218 and subsequently emit them from the main surfaces of the guide plates 217 on the front side. The reflecting surfaces 218 are provided by slanting the backside of the plates 217 to the propagation direction of the light fluxes incident on the plates 217. That is, the propagation direction of the light fluxes in the plates 217 is polarized due to internal reflection on the reflecting surfaces 218. Then, the light fluxes polarized at 90 degrees in the propagation direction by the reflecting surfaces 218 are emitted from the light-transmitting guide plates 217 on the front side perpendicularly to their main surfaces (emitting surface). Considering a view angle in the vertical direction (perpendicular view angle), alternatively, the light fluxes may be emitted with property having a degree of luminous intensity distribution.

In the lighting device, the light-transmitting guide bodies 201, 202 and 203 and the light-transmitting guide plates 217 may be easily produced by means of any of extrusion, pressing and injection molding using thermoplastic resin. Namely, the light-transmitting guide bodies 201, 202 and 203 can be easily produced in general forming processes adopting molding dies, including the reflecting surfaces 207, 208 and 209 each composed of the slanted surfaces 210 integrally. In forming the light-transmitting guide bodies 201, 202 and 203, the reflecting surfaces 207, 208 and 209 are formed apart from the respective one ends (incident surfaces) of the light-transmitting guide bodies 201, 202 and 203 at different distances from each other. The above-mentioned lighting device is completed by arranging the above ends of the so-formed light-transmitting guide bodies 201, 202 and 203 in line and further allowing them to oppose to respective one ends of the light-transmitting guide plates 217.

Embodiment of Display Device

The display device using the above-mentioned lighting device will be described below. In this display device, the light fluxes emitted from the front side of the light-transmitting guide plates 217 are incident on a liquid crystal display element (transmission TFT-LCD) 216 as the spatial light modulating element, as shown in FIGS. 9 and 12. In these figures, there is illustrate the illustrated liquid crystal display element 216 provided with a polarizing filter 211 on the incident side, a sealing glass 212 and picture (transparent) electrodes 213R, 213G and 213B on the emission side. In actual, however, the same element 216 further includes a not-shown liquid crystal layer formed on the front side of the electrodes 213R, 213G and 213B. This liquid crystal layer is sealed up with the sealing glass 212 (on the incident side of light fluxes) and a not-shown sealing glass (on the emission side of light fluxes).

In order to effect color displaying in this display device, a first color of three primary colors (e.g. red) is allocated for the light flux emitted from the first light source 204 of the lighting device, a second color (e.g. green) for the light flux from the second light source 205, and a third color (e.g. blue) is allocated for the light flux emitted from the third light source 206.

The light flux in the first color emitted from the first light-transmitting guide body 201 is transmitted to the light-transmitting guide plates 217 through the second and third light-transmitting guide bodies 202 and 203. After being polarized by the light-transmitting guide plates 217, the light flux emitted therefrom enters the picture electrodes 213R in charge of the first color in the liquid crystal display element 216, through the polarizing filter 211 and the sealing glass 212 on the incident side.

Similarly, the light flux in the second color emitted from the second light-transmitting guide body 202 is transmitted to the light-transmitting guide plates 217 through the third light-transmitting guide body 203. After being polarized by the light-transmitting guide plates 217, the light flux emitted therefrom enters the picture electrodes 213G in charge of the second color in the liquid crystal display element 216, through the polarizing filter 211 and the sealing glass 212 on the incident side.

The light flux in the third color emitted from the third light-transmitting guide body 203 is polarized by the light-transmitting guide plates 217 and successively enters the picture electrodes 213B in charge of the third color in the liquid crystal display element 216, through the polarizing filter 211 and the sealing glass 212 on the incident side.

In this way, the light fluxes in respective colors enter the picture electrodes 213R, 213G and 213B with respect to each color and are subjected to polarization modulation with respect to each pixel since the light fluxes are transmitted through the liquid crystal layer (parts) corresponding to the picture electrodes 213R, 213G and 213B. After the polarization modulation, the light fluxes are emitted from the sealing glass on the emission side in front. On the front side of the sealing glass, the light fluxes are emitted with respective intensity modulated as a result of filtering out an emission-side polarizing filter having its optical axis perpendicular to that of the incident-side polarizing filter 211. The color displaying is effected since the intensity of each light flux of respective colors is modulated with respect to each pixel.

Preferably, the polarizing filter 211 is formed, on its incident surface for the light fluxes, with a cylindrical-lens (or microlens) array 214 for controlling the distribution of the light fluxes, as shown in FIG. 12. This cylindrical-lens (or microlens) array 214 includes a plurality of cylindrical lenses (or microlenses) set in array where bus lines (generatrices) of respective cylindrical lenses (or microlenses) are parallel or perpendicular to the incident direction of light fluxes from the light-transmitting guide body 203 incident on the light-transmitting guide plates 217. By the cylindrical-lens (or microlens) array 214, the light fluxes emitted from the lighting device are converges in parallel or perpendicularly to the incident direction of light fluxes on the light-transmitting guide plates 217 once and thereafter, the light fluxes are incident on the corresponding picture electrodes 213R, 213G and 213B with diffusion in the convergence direction. As the light fluxes through the picture electrodes 213R, 213G and 213B continue to be diffused furthermore, the view angle (i.e. angular range with which a display image becomes visible) can be broadened furthermore.

Instead, the cylindrical-lens (or microlens) array 214 may be arranged on the front side (emission side) of the light-transmitting guide plates 217. Alternatively, the cylindrical-lens (or microlens) array 214 may be provided in both the polarizing filter 211 and the light-transmitting guide plates 217.

As shown in FIG. 10, when the display device has a rectangular display screen (i.e. display area of the spatial light modulating element—the liquid crystal element 216), it is desirable that the light-transmitting guide bodies 201, 202 and 203 are arranged along either or both long sides of the display screen.

Figure 13:
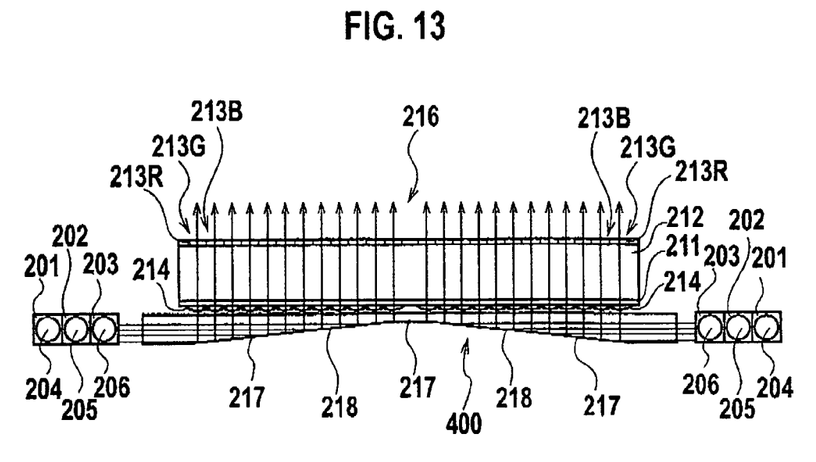
FIG. 13 is a side view showing another example of the display device of FIG. 9.

FIG. 13 is a side view showing another example of the display device of the present invention.

In this display device, as shown in FIG. 13, the light-transmitting guide bodies 201, 202 and 203 are arranged along both long sides of the display screen. A light-transmitting guide plate assembly 400 is interposed between the light-transmitting guide bodies 201, 202 and 203 on one side and the light-transmitting guide bodies 201, 202 and 203 on the other side. Therefore, the light-transmitting guide plate assembly 400 is equivalent to a structure where the light-transmitting guide plate assembly 200 (see FIG. 12) in the previously-mentioned lighting device is doubled symmetrically. In operation, the light-transmitting guide plates 217 forming the light-transmitting guide plate assembly 400 are subjected to incident light fluxes through both lateral surfaces (upper and lower side surfaces) of each guide plate 217.

4th. Embodiment of Lighting Device

Figure 14:
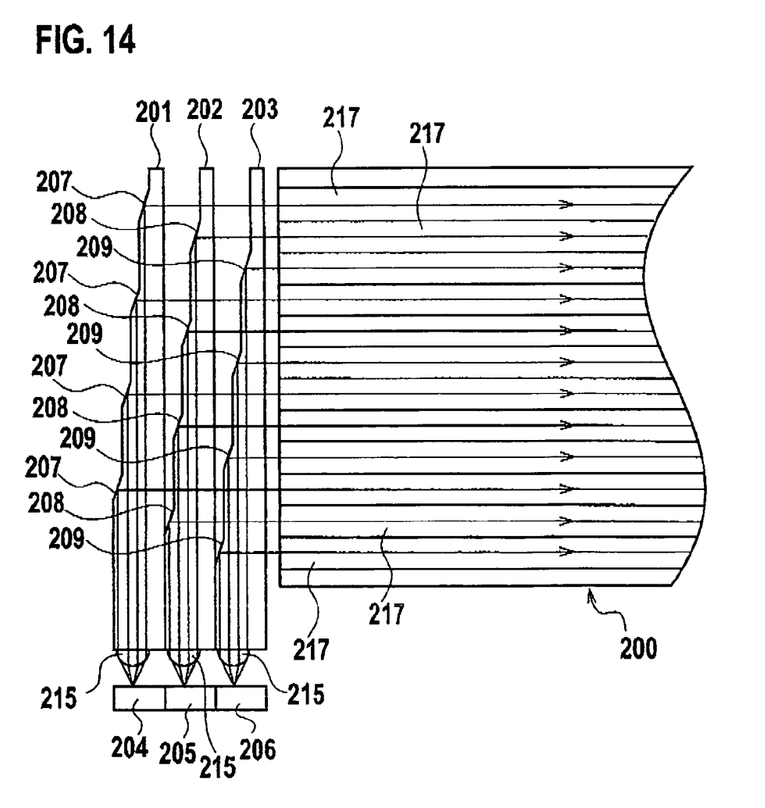
FIG. 14 is a front view showing the essential part of a lighting device in accordance with a fourth embodiment of the present invention.

FIG. 14 is a side view showing the essential part of the lighting device in accordance with the fourth embodiment of the present invention.

According to the fourth embodiment, as shown in FIG. 14, convex lenses 215 are formed on respective one ends of the light-transmitting guide bodies 201, 202 and 203 on which the light fluxes from the light sources 204, 205 and 206 are incident. By the convex lenses 215, the light fluxes from the light sources 204, 205 and 206 can be modified to high-accuracy parallel fluxes in the light-transmitting guide bodies 201, 202 and 203, improving the light utilization efficiency of the light fluxes from the light sources 204, 205 and 206. In addition, the intensity distribution of the light fluxes emitted from the light-transmitting guide plates 217 in front is uniformed to allow the emitted light to be reduced in luminance unevenness.

Desirably, the convex lenses 215 are formed by aspherical cylindrical lenses optimized in accordance with emission distribution angles of the light emitting elements of the light sources 204, 205 and 206. As will be understood, the light-transmitting guide bodies 201, 202 and 203 can be easily produced in integral with the convex lenses 215 by a general forming step adopting a molding die.

In common with the third and fourth embodiments, the light fluxes in different colors for every light-transmitting guide bodies 201, 202 and 203, which have been emitted from the light sources (light emitting elements) 204, 205 and 206 and further propagated in the light-transmitting guide bodies 201, 202 and 203, are emitted from the lateral surfaces of the light-transmitting guide bodies 201, 202 and 203 after the propagation directions of the light fluxes are changed by the reflecting surfaces 207, 208 and 209. Here, the light flux emitted from one light-transmitting guide body 201 (202 or 203) is incident on the lateral side of the light-transmitting guide plate assembly 200 through the other light-transmitting guide body's part where the reflecting surfaces are not formed. Subsequently, the light fluxes propagated in the light-transmitting guide plate assembly 200 are emitted from the front side of the assembly 200 and incident on the liquid crystal element (spatial light modulating element) 216.

Therefore, according to the lighting device of the third and fourth embodiments, it is possible to allow illumination light in designated color to be incident on a predetermined pixel in the liquid crystal element (spatial light modulating element) 216 without using a color filter. Thus, as there is no loss of illumination light caused by using the color filter, it is possible to accomplish both manufacturing facility and cost saving of the lighting device with reduction in the number of light emitting elements while maintaining the required luminance. Further, it is possible to save the power consumption of the lighting device. By reducing the thicknesses of the light-transmitting guide plate assembly 200, it is also possible to miniaturize the lighting device.

In the display device of the third and fourth embodiments, similarly, as there is no loss of illumination light caused by using the color filter, it is possible to accomplish both manufacturing facility and cost saving of the display device with reduction in the number of light emitting elements while maintaining the required luminance. Further, it is possible to save the power consumption of the display device. By reducing the thicknesses of the light-transmitting guide plate assembly 200, it is also possible to miniaturize the display device.

Practical Example of Display Device

Experimentally, we have manufactured a display device of the fourth embodiment with the use of LED-array light sources as the light sources 204, 205 and 206. In the display device, the emission distribution angles of respective LED chips forming the LED-array light sources are approx. 80 degrees (±40 degrees) in the horizontal direction (i.e. the arranging direction of LED chips) and 40 degrees (±20 degrees) in the vertical direction. Of course, the light-transmitting guide bodies 201, 202 and 203 are formed, on respective one ends, with the convex lenses 215.

Under condition that the light fluxes in red, green and blue having 40 lm (lumen) in illuminance each are emitted from the light sources 204, 205 and 206, the whole light-flux intensity incident on the spatial light modulating element (the liquid crystal display element 216) was 79.28 lm. In consequence, the maximum light utilization efficiency (=overall intensity of incident light fluxes on the liquid crystal display element/overall intensity of light fluxed emitted from the light sources) was 66.1% [by calculation 79.28/(40×3)=0.661], which is on a level with the maximum light utilization efficiency of the conventional lighting device for liquid crystal display element. As the display device of the embodiment has no absorption of light due to color filters, which is incidental to the conventional lighting device, it results in a maximum light utilization efficiency three times as much as the conventional lighting device has.

Therefore, when illuminating a transmission liquid crystal display element (TFT-LCD) with the use of the light device of the present invention, it is possible to reduce the number of light emitting elements required for a given illuminance to one-third of those of the conventional lighting device. In addition, it is also possible to reduce the power consumption to one-third of that of the conventional lighting device. Also, it is possible to reduce respective thicknesses of the light-transmitting guide plates 217 in comparison with the conventional lighting device.

Further, if adopting laser diode (LD) chips for the light emitting elements forming the light sources 204, 205 and 206, then the polarizing filter 211 on the incident side of the becomes dispensable since laser beam has a uniform polarization direction generally. In consequence, it is possible to reduce the number of constituents of the lighting device and also possible to improve the light utilization efficiency since the half-reduction of light fluxes to be incident on the liquid crystal layers is no longer caused by such a polarizing filter. Additionally, as the laser diode has an emission spectrum whose half-power bandwidth is narrow, it is possible to improve the color purity of the display device furthermore.

According to the present invention, with the adoption of the lighting device in the above-mentioned embodiments, it is possible to effect appropriate color reproduction originating in nonuse of color filters while providing a display image with high luminance, and also possible to provide the display device capable of saving both manufacturing cost and power consumption and miniaturizing its own size.

Finally, it will be understood by those skilled in the art that the foregoing descriptions are nothing but embodiments of the disclosed lighting device and the disclosed display device and therefore, various changes and modifications may be made within the scope of claims.

What is claimed is:

1. A lighting device comprising:
   a plurality of light-transmitting guide plates laminated in three or more layers; and
   a plurality of light emitting elements opposed to respective lateral sides of the light-transmitting guide plates to thereby emit light fluxes in different colors to the light-transmitting guide plates respectively, wherein each of the light-transmitting guide plates is provided, on a backside thereof with a plurality of reflecting surfaces that change a propagation direction of the light flux propagated in the each light-transmitting guide plate to thereby emit the light flux from a front side of the each light-transmitting guide plate.

2. The lighting device of claim 1, further comprising a plurality of cylindrical lenses, wherein the cylindrical lenses are arranged on respective lateral surfaces of the light-transmitting guide plates, and the light fluxes emitted from the light emitting elements are adapted so as to be incident on the lateral surfaces of the light-transmitting guide plates through the cylindrical lenses.

3. A display comprising:

a plurality of light-transmitting guide plates laminated in three or more layers, the light-transmitting guide plates including, at least, a first light-transmitting guide plate, a second light-transmitting guide plate and a third light-transmitting guide plate;

a plurality of light emitting elements opposed to respective lateral sides of the light-transmitting guide plates to thereby emit light fluxes in three primary colors to the light-transmitting guide plates respectively;

a plurality of reflecting surfaces formed on the backside of each of the light-transmitting guide plates to change a propagation direction of the light flux propagated in the each light-transmitting guide plate, thereby emitting the light flux from a front side of the each light-transmitting guide plate; and a spatial light modulating element arranged so as to oppose the front sides of the light-transmitting guide plates, wherein the light flux in a first color forming the three primary colors emitted from the first light-transmitting guide plate is adapted so as to be incident on pixels of the spatial light modulating element corresponding to the first color, the light flux in a second color forming the three primary colors emitted from the second light-transmitting guide plate is adapted so as to be incident on pixels of the spatial light modulating element corresponding to the second color, and the light flux in a third color forming the three primary colors emitted from the third light-transmitting guide plate is adapted so as to be incident on pixels of the spatial light modulating element corresponding to the third color, whereby displaying of a color image can be effected by the light fluxes in the three primary colors incident on the pixels corresponding to the first, second and the third colors.

4. The display device of claim 3, further comprising a plurality of cylindrical lenses, wherein the cylindrical lenses are arranged on respective lateral surfaces of the light-transmitting guide plates, and the light fluxes emitted from the light emitting elements are adapted so as to be incident on the lateral surfaces of the light-transmitting guide plates through the cylindrical lenses.

* * * * *